May 8, 1956

J. E. McELLIGOTT 2,745,029

POLYPHASE GENERATORS

Filed June 10, 1955

INVENTOR.
John E. McElligott

BY

Smith, Olsen, Baird & Miller, Attys

INVENTOR.
John E. McElligott

May 8, 1956    J. E. McELLIGOTT    2,745,029
POLYPHASE GENERATORS
Filed June 10, 1955    3 Sheets-Sheet 3
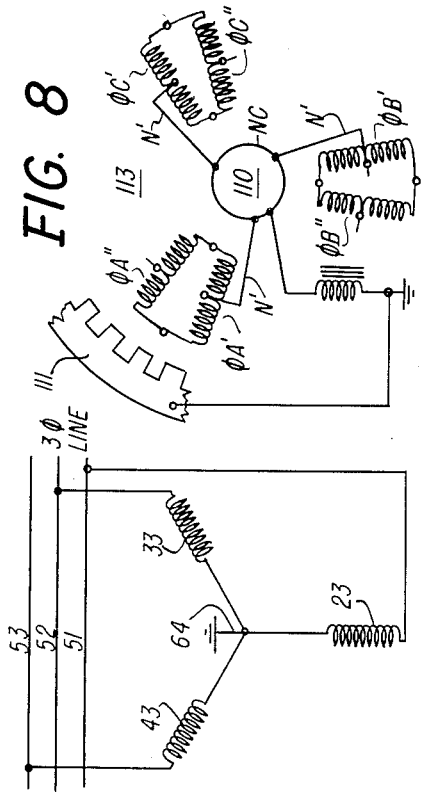
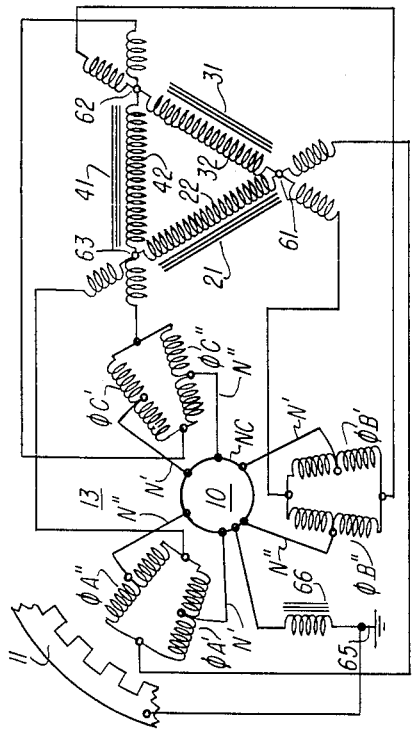
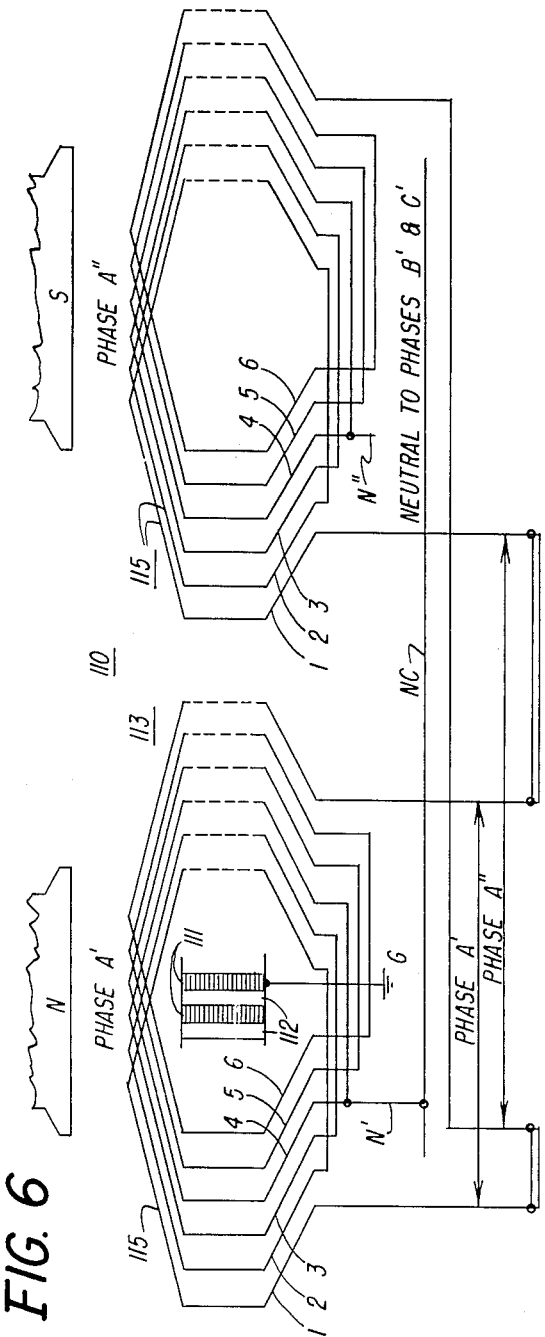
INVENTOR.
John E. McElligott
BY
Smith, Olsen, Baird & Miller, Attys.

United States Patent Office 2,745,029
Patented May 8, 1956

2,745,029

POLYPHASE GENERATORS

John E. McElligott, Pasadena, Calif., assignor to General Electric Company, a corporation of New York Application June 10, 1955, Serial No. 514,587

16 Claims. (Cl. 310—202)

The present invention relates to dynamoelectric machines, and more particularly to improved armature windings for polyphase generators of large size.

A conventional turbine-driven polyphase generator of large size comprises a stationary armature element and a cooperating rotatable field element, and may be operative to generate 3-phase electric power at a frequency of 60 cycles, whereby the field element, if of 2-pole construction, is rotated at 3600 R. P. M. In the generator, the armature element or core is formed of magnetizable material and is normally provided with an elongated cylindrical opening therethrough that is bounded by a number of angularly spaced-apart winding slots, in which a composite 3-phase armature winding is carried, the armature winding including three individual phases that are frequently connected in Y or star relation to supply the load. The field element is also formed of magnetizable material and is normally of the elongated cylindrical-rotor type and carries a field winding, the field element being arranged in the armature opening and being operative upon rotation to induce phase voltages in the respective phases of the armature winding.

Ordinarily, each phase of the armature winding includes a number of phase belts each provided with a plurality of series connected coils each having two coil sides, the coil sides being distributed in the winding slots of the armature element; the armature winding is arranged in two layers so that each winding slot receives two of the coil sides respectively disposed in the top and in the bottom thereof; and each of the coil sides includes an insulating casing enclosing the conductors thereof for the purpose of electrically insulating the coil side from the contiguous coil side and from the armature element.

In directly cooled machines, each of the winding slots also accommodates facility for cooling the two contained coil sides, which cooling facility ordinarily includes a duct arrangement through which a current of air or other gas, or stream of liquid is forced; whereby each of the slots must accommodate two of the coil sides, as well as the cooling facility therefor; and each of the coil sides includes the conductors thereof and the enclosing insulating casing.

Now in the design of polyphase generators, there is an ever-increasing demand for greater power ratings; whereby the competition for space in the armature between the magnetic material thereof and the winding slots therein, and among the several elements arranged in each winding slot thereof, presents design problems of ever-increasing complexity.

Accordingly, it is a general object of the present invention to provide in a polyphase generator, an improved arrangement of the composite armature winding so that an increased power output may be realized from a generator structure of given physical dimensions, whereby the power output per unit volume of the generator structure is substantially increased.

Another object of the invention is to provide in a polyphase generator, an improved arrangement of the composite armature winding so that the induced phase voltage component between the armature element and any one of the coil sides included in any one of the phases of the armature winding is substantially smaller than the induced phase voltage between the opposite extremities of the one phase of the armature winding, thereby permitting a corresponding reduction in the thickness of the insulating casings respectively enclosing the conductors of the coil sides, so as to render available additional space that may be employed in the design either to accommodate a reduction in the width of the winding slots or to accommodate more current-carrying facility or cooling facility in the winding slots.

A further object of the invention is to provide a dynamoelectric machine provided with a polyphase winding incorporating an improved arrangement of the elements thereof.

Further features of the invention pertain to the particular arrangement of the elements of the polyphase generator, whereby the above-outlined and additional operating features thereof are attained.

The invention, both as to its organization and principle of operation, together with further objects and advantages thereof, will best be understood by reference to the following specification taken in connection with the accompanying drawings, in which:

Fig. 5 is a schematic diagram of a power generating and distributing system incorporating the machine provided with the armature winding of Fig. 1;

Fig. 6 is a diagrammatic illustration, similar to Fig. 1, of a modified form of the armature winding;

Fig. 8 is a fragmentary schematic diagram, similar to Fig. 5, of a power generating and distributing system incorporating the machine provided with the armature winding of Fig. 6.

Figure 1:
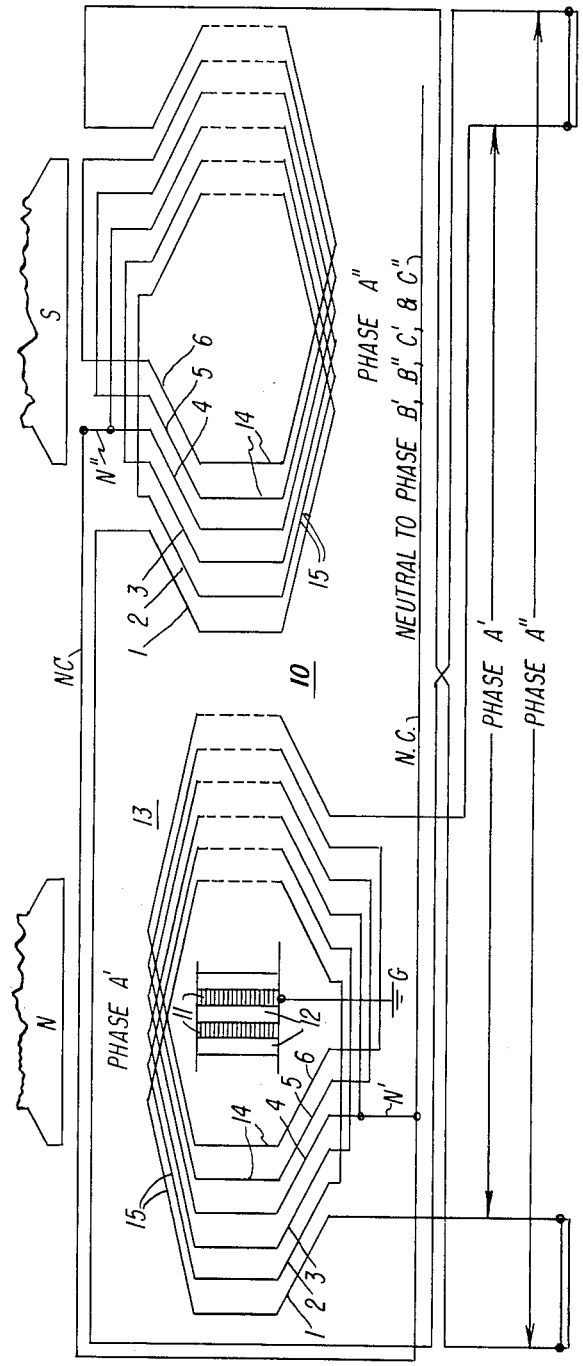
Figure 1 is a diagrammatic illustration of a portion of a dynamoelectric machine provided with an armature winding embodying the present invention, the machine being in the form of a generator of 3-phase, 2-pole, 2-circuit, 36-slot core construction, only one phase of the 3-phase armature winding being illustrated.
Figure 2:
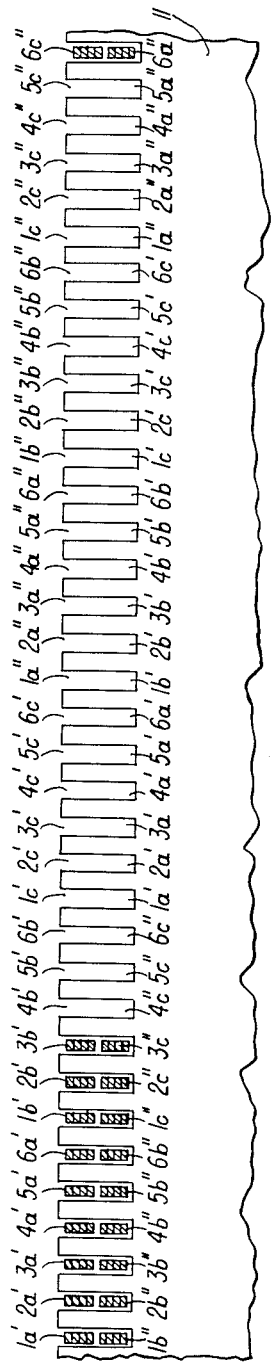
Fig. 2 is an enlarged fragmentary sectional view of the armature element of the generator and the 3-phase armature winding carried in the slots of the core thereof.

Referring now to Figs. 1 and 2 of the drawings, there is illustrated a dynamoelectric machine 10 in the form of a turbine-driven generator, and embodying the features of the present invention. The generator 10 is of the 2-pole, 3-phase, 2-circuit type and comprises a stationary armature element or core 11 of magnetizable material and a cooperating rotatable field element represented by the poles respectively indicated at N and S. The core 11 comprises thirty-six slots 12; and a 2-layer, 3-phase, 2-circuit winding 13 is carried by the core 11. The winding 13 comprises the three phases A', A" and B', B" and C', C"; the notations A' and A" designating the two parallel connected phase belts or circuits in the composite phase A; etc. As more fully explained hereinafter, the voltages induced between the extremities of the two phase belts or circuits in phase A are entirely congruent so that they are connected in parallel relation; however, the induced voltages at corresponding intermediate points in the two phase belts or circuits in phase A may not be congruent, so it is convenient to employ the terminology phase belt A' and phase belt A'' in conjunction with the two respective phase belts or circuits connected in parallel in the phase A. The winding 13 comprises thirty-six coils each including two coil sides 14 and an end connector 15. In Fig. 1 only the phase belts A' and A'' of the winding 13 are illustrated; however, in Fig. 2, the arrangement of the coil sides 14 in all of the phases A', A'', B', B'', C' and C'' are illustrated. As indicated in Fig. 1, the coils are chorded, having a coil pitch equal to ⅔ of the pole pitch. However, it will be understood that the invention is readily applicable to other slot arrangements and to other coil pitches.

Figure 3:
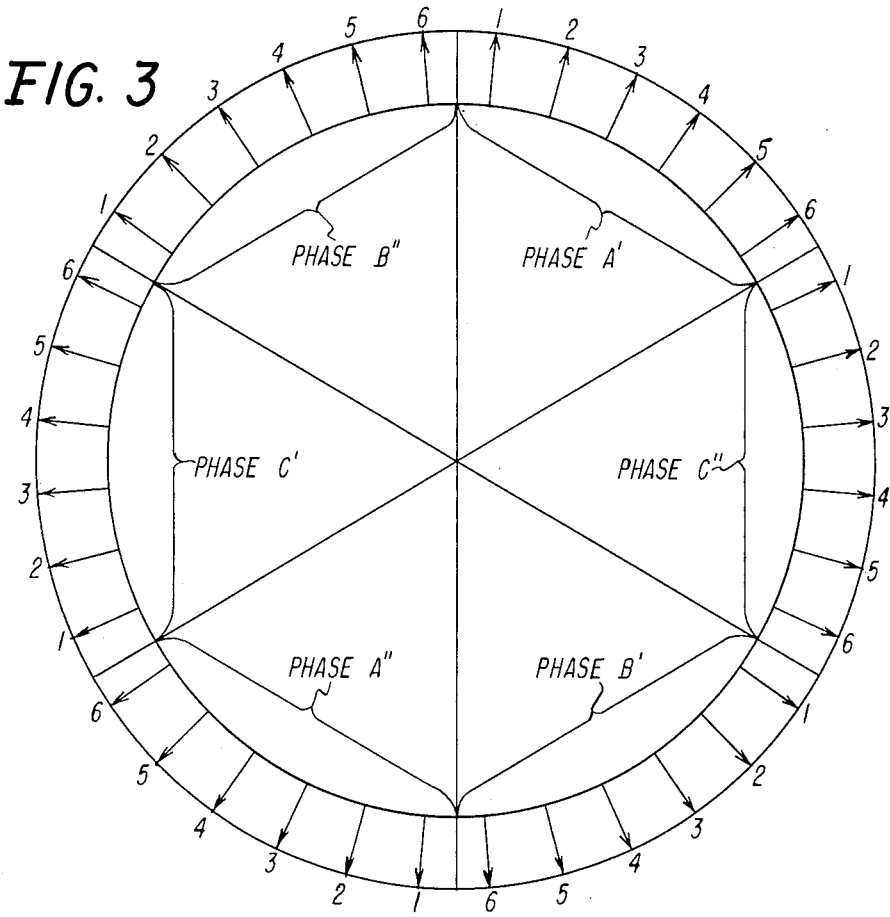
Fig. 3 is a combined schematic diagram of the phase belt arrangement in the armature winding and a vectorial diagram of the phase voltage components induced in the different phase belts of the armature winding.

As indicated in Fig. 3, the winding 13 comprises three positive phase belts A', B', C' and three negative phase belts A'', B'', C'' that are arranged in sequence about the core 11. Each of the phase belts comprises one of the circuits in the corresponding phase, and consists of six series connected coils each having two coil sides 14. In the winding 13, the coils in the phase belts A' and A'' are reversed with respect to the opposite ends of the core 11 so that it is necessary to make connections to the exterior at both ends of the winding 13. Also the two phase belts A' and A'' in phase A are properly poled and connected in parallel relation (connected with reversals), since one of the phase belts is under the N pole while the other of the phase belts is under the S pole, so that the phase voltages respectively induced therein are in phase with each other at the extremities thereof.

Still referring to Fig. 3, each of the six phase belts of the winding 13 subtends 60 electrical degrees and includes six coils. It will be noted that the positive phase belt A' includes only coils arranged in one of the circuits of the phase A; and, likewise, the negative phase belt A'' includes only coils arranged in the other of the circuits of the phase A. Referring now to Fig. 1, it will be observed that the six coil sides 14 of the six coils arranged in the positive phase belt A' are arranged in sequence in the winding slots 12 of the core 11, as indicated at 1, 2, 3, 4, 5 and 6; and in a similar manner, the six coil sides 14 of the six coils arranged in the negative phase belt A'' are arranged in sequence in the winding slots 12 of the core 11, as indicated at 1, 2, 3, 4, 5 and 6.

It is noted that the winding patterns of the coils included in the phase belts B', B'', C' and C'' are identical to that of the coils included in the phase belts A' and A'', as illustrated in Fig. 1 and described above; which condition is indicated by the arrangement and disposition of the coil sides 14 in the winding slots 12 of the core 11, as shown in Figs. 2 and 3.

Again referring to Fig. 1, the phase belts A' and A'', the junctions between the coils 3 and 4 are tapped and brought-out as neutrals N' and N''; which neutrals are connected to a common neutral conductor NC. Similarly, corresponding neutrals are brought-out of the phase belts B', B'', C' and C'' and connected to the common neutral conductor NC.

Figure 4:
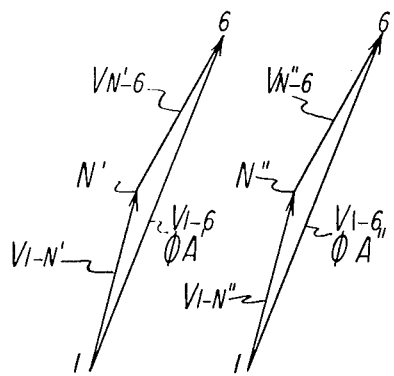
Fig. 4 is a vector diagram of the voltages induced in the two circuits of one phase of the armature winding of Fig. 1.

Referring now to Fig. 4, it will be observed from this vector diagram that in the phase belts A' and A'' the terminal voltages $V_{1-6}$ and $V_{1-6}$ are entirely congruent and may be connected in parallel relation. Likewise, the voltages $V_{1-N'}$ and $V_{1-N''}$ are entirely congruent; whereby the voltages at the neutrals N' and N'' are also entirely congruent and may be connected to the common neutral conductor NC, without circulating currents between the phase belts A' and A''. Of course, the conditions are the same in the phase belts B', B'' and C', C''. Also, it will be understood that the maximum voltage between the core 11 and the phase belt A' is the voltage $V_{1-N'}=V_{N'-6}$, that is only slightly greater than one-half of the phase voltage $V_{1-6}$; whereby, the coil insulation may be substantially reduced, as to thickness, with complete safety and great advantage, as explained more fully hereinafter.

At this point, it is noted that it can be established mathematically and by actual measurements, when one of a number of parallel connected circuits in a phase is provided with a neutral, there is no voltage present in any of the other circuits of that phase that is greater than the terminal to neutral voltage in the one circuit, and regardless of whether neutrals are actually brought-out from the other circuits. In other words, in phase A, the neutral connection N' in the phase belt or circuit A' establishes the maximum voltage between terminal and neutral, not only in the phase belt or circuit A', but also in the parallel connected phase belt or circuit A''; whereby, in fact, the neutral N'' in the phase belt or circuit A'' is unnecessary to achieve the desired reduction in voltage between the core N and any point in the phase belt or circuit A''. Moreover, it is pointed out that it is not essential that the neutral point N' in the phase belt or circuit A' occurs at the mid-point therein, although this position is most advantageous, as it effects a greater reduction in the voltage against which the coils must be insulated; and while the neutral points may not occur at the mid-points in the parallel circuits in a phase, they must occur at corresponding points therein, where the voltages are congruent, in order to avoid circulating currents therebetween, if the neutral points are connected together.

Referring now to Fig. 5, a power generating and distributing system is illustrated that incorporates the generator provided with the armature winding 13 of Fig. 1; which system also includes three single phase transformers respectively provided with three magnetic cores 21, 31 and 41, as well as a 3-phase line provided with three line conductors 51, 52 and 53. The cores 21, 31 and 41 respectively carry primary windings 22, 32 and 42 and secondary windings 23, 33 and 43. The primary windings 22–32, 32–42 and 42–22 are delta connected at the intermediate points 61, 62 and 63, respectively, to provide the double delta extensions illustrated; and the extremities of the primary windings 22, 32 and 42 are connected to the pairs of terminals of the composite phases A, B and C, respectively, of the armature winding 13. Further, the secondary windings 23, 33 and 43 are Y-connected, the neutral being grounded, as indicated at 64; while the extremities of the secondary windings 23, 33 and 43 are respectively connected to the line conductors 51, 52 and 53. The core 11 is connected to a ground potential bus 65; and, if desired, the neutral conductor NC of the armature winding 13 is connected via an inductive reactor 66, or other impedance element, to the ground potential bus 65. At this point it is noted, that the connection of the neutral conductor NC via the reactor 66 to the ground potential bus 65, and consequently to the core 11, is not essential, as the capacitive coupling of the armature winding 13 through its insulation to the core 11 will automatically maintain the neutral conductor NC at ground potential.

In connection with the system of Fig. 5, it is noted that the six conductors connecting the extremities of the phases A, B, and C and the primary windings 22, 32 and 42 of the respective transformers 21, 31 and 41, are required, since full phase voltage exists between the two conductors used for each phase; and the double delta extensions are provided in the primary windings 22, 32 and 42, in order to prevent circulating currents therebetween. Specifically, from Fig. 4, it will be understood that the voltages from neutral to the three inside terminals of the phases A, B and C are successively displaced 120 electrical degrees; and likewise, the voltages from neutral to the three outside terminals of the phases A, B and C are successively displaced 120 electrical degrees; however, these two balanced 3-phase supply sources are out of phase with respect to each other by an angle differing from 180 electrical degrees; whereby, the neutral connections render the armature winding 13 a modified 6-phase winding from this particular point of view.

This arrangement is very advantageous in view of the fact that it, together with the arrangement of the two parallel circuits per phase in the armature winding 13, effects a very substantial reduction in the voltages relative to ground that are encountered in the armature winding 13, while maintaining a given kva rating thereof; whereby the arrangements permit a corresponding reduction in the thickness of the insulation of the casings enclosing the coil sides 14. Now this further permissible reduction in the thickness of the insulation of the casings enclosing the coil sides 14 renders available additional space in the slots 12 in the core 11; which additional space may be used for various additional design purposes. For example, the width of the winding slots may be reduced, so as to effect an increase in the cross-sectional area of the magnetic material of the core 11; on the other hand, the cross-sectional area of the conductors of the coil sides 14 may be increased, or the cross-sectional area of the cooling ducts disposed in the slots 12 of the core 11 may be increased. Accordingly, it will be appreciated that the arrangement of the winding 13 reduces the voltages relative to ground that are encountered in the generator 10, without reducing the kva rating thereof; whereby the permissible reduction in the required thickness of the insulation of the casings of the coil sides 14 provides the additional space in the winding slots 12 in the core 11 that is available for utilization in design factors effecting an increased rating of the generator 10, and without increasing the physical dimensions thereof.

Moreover, the armature winding arrangement is not limited to any one specific winding slot design in the core 11, or to any one specific coil arrangement or structure in the phase belts included in the phases of the generator 10, and may be generally applied to a wide variety of standard core structures and coil arrangements and structures; whereby the present invention has a wide field of utilization in polyphase generators.

Referring now to Fig. 6 of the drawings, a modified form of dynamoelectric machine 110 is illustrated, and embodying the features of the present invention. The machine 110 is identical to the machine 10 previously described, except that the armature winding 113 is modified by the reversal of the coils included in phase "A", so that all of the connections are made at only one end of the core 11. Thus the coils respectively included in the phase belts A' and A" are symmetrically arranged; whereby only the terminal to terminal voltages of the phase belts A' and A" are congruent, so that only the neutrals N' of the phase belts A', B' and C' are connected to the neutral conductor NC, the neutral N" in the phase belt A" being indicated only for purpose of explanation, as in fact this neutral is not brought out.

Figure 7:
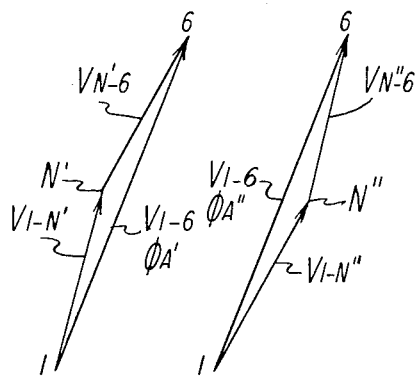
Fig. 7 is a vector diagram, similar to Fig. 4, of the voltages induced in the two circuits of one phase of the armature winding of Fig. 6.

Referring to Fig. 7, it will be observed that in the phase belts A' and A" only the terminal voltages $V_{1-6}$ and $V_{1-6}$ are congruent; whereby only the corresponding terminals thereof may be connected in parallel relation. Specifically, the voltages at the neutrals N' and N" of the respective phase belts A' and A" are substantially out of phase, so that connection of both of these neutrals to the common neutral conductor NC would result in circulating currents of short-circuit magnitude. Accordingly, only the neutrals N' of the phase belts A', B' and C' are connected to the common neutral conductor NC. Fortunately, however, these neutral connections in the phase belts A', B' and B', bring about the desired result that no voltage relative to ground is present in the other phase belts A", B" and C" that is greater than that present in the phase belts A', B' and C', since the phase belts A', A", etc., are connected in parallel relation in the composite phases A, etc.; whereby the permissible reduction of the insulation of the coil sides 14 in all phases is the same.

Referring now to Fig. 8, the power operating and distributing system incorporating the generator 110 is the same as that of Fig. 5 incorporating the generator 10, except for the differences in the connection and arrangement of the armature winding 113, as previously explained. In other words, only the neutrals N' of the phase belts A', B' and C' are connected to the common neutral conductor NC; the transformer arrangement and the other connections being identical to those illustrated in Fig. 5.

While the dynamoelectric machines 10 and 110 have been illustrated as being of 3-phase, 2-pole, 2-circuit construction, the invention is not limited to this arrangement; and generalizing, it may be stated that good winding design normally requires one phase belt per phase per pole and accommodates as many as two circuits per pair of poles, the larger numbers of circuits reducing the voltage requirements of a machine of given rating. Thus, in a 2-pole machine it is advantageous to provide 2-circuits per phase; and it follows that in a 4-pole machine it is advantageous to provide 4-circuits per phase. Similarly, in a 6-pole machine it is advantageous to provide 6-circuits per phase, but only 2-circuits per phase may be provided. Thus, in a polyphase, 6-pole, 2-circuit machine, each of the circuits in each phase includes three series connected phase belts; whereby the neutrals are broughtout in the middle phase belts therein, in accordance with the present invention, so as to reduce the voltages relative to ground against which insulation must be provided.

Accordingly, in the appended claims, the statement that each phase includes an odd number of series connected phase belts is intended to cover the general case of one phase belt, as well as the special cases of three, five, etc., phase belts. In other words, the odd number mentioned is normally "1," although it may be "3," "5," etc.

In view of the foregoing, it is apparent that there has been provided in a polyphase generator, an improved armature winding arrangement that is effective substantially to increase the power output of the generator, without increasing the physical dimensions thereof, and that is exceedingly flexible with reference to other generator design factors.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A dynamoelectric machine comprising a multi-slot core and a polyphase winding carried in the slots of said core, each phase of said winding including an odd number of series connected phase belts and being arranged in two series connected sections with a junction therebetween, the junctions in the phases of said winding occurring at corresponding points therein, and a neutral connection between the junctions in the phases of said winding, whereby the induced phase voltage component between any point on any one of the phases of said winding and said core is substantially smaller than the induced phase voltage of the one phase of said winding.

2. The dynamoelectric machine set forth in claim 1, wherein the two series connected sections of each phase of said winding are substantially equal.

3. The dynamolectric machine set forth in claim 1, wherein said odd number of series connected phase belts included in each phase of said winding is one.

4. The dynamoelectric machine set forth in claim 1, wherein said odd number of series connected phase belts included in each phase of said winding is three.

5. The dynamoelectric machine set forth in claim 1, and further comprising a reference potential bus connected to said core, and another connection including an impedance element between said neutral connection and said reference potential bus.

6. The dynamoelectric machine set forth in claim 5, wherein said impedance element consists essentially of an inductive reactor.

7. A dynamoelectric machine comprising a multi-slot core and a polyphase winding carried in the slots of said core, each phase of said winding including a single series connected phase belt and being arranged in two substantially equal series connected sections with a junction therebetween, and a neutral connection between the junctions in the phases of said winding, whereby the induced phase voltage component between any point on any one of the phases of said winding and said core is substantially smaller than the induced phase voltage of the one phase of said winding.

8. A dynamoelectric machine comprising a multi-slot core and a polyphase winding carried by said core, each phase of said winding including a single series connected phase belt and being arranged in two substantially equal series connected sections with a junction therebetween, each of the phase belts of said winding including a given number of series connected coils, each having two coil sides, whereby each section of each phase of said winding includes the same number of series connected coil sides, said coil sides lying in the slots in said core, each of said coil sides being provided with an insulating casing electrically insulating it from said core, and a neutral connection between the junctions in the phases of said winding, whereby the induced phase voltage component between any one of said coil sides included in any one of the phases of said winding and said core is substantially smaller than the induced phase voltage of the one phase of said winding.

9. The dynamoelectric machine set forth in claim 8, wherein said winding is arranged in two layers in the slots in said core, and said coils are chorded.

10. A dynamoelectric machine comprising a multi-slot core and a polyphase winding carried in the slots of said core, each phase of said winding being provided with a plurality of parallel connected circuits each including an odd number of series connected phase belts, at least one of the circuits in each phase of said winding being arranged in two series connected sections with a junction therebetween, the junctions in the circuits in the phases of said winding occurring at corresponding points therein, and a neutral connection between the junctions in the circuits in the phases of said winding, whereby the induced phase voltage component between any point on any one of the circuits in any one of the phases of said winding and said core is substantially smaller than the induced phase voltage of the one phase of said winding.

11. The dynamoelectric machine set forth in claim 10, wherein the two series connected sections of the one circuit in each phase of said winding are substantially equal.

12. The dynamoelectric machine set forth in claim 10, wherein each circuit in each phase of said winding is arranged in two series connected sections with a junction therebetween.

13. The dynamoelectric machine set forth in claim 10, wherein each phase of said winding is provided with a number of parallel connected circuits corresponding to the number of poles of said machine.

14. The dynamoelectric machine set forth in claim 10, wherein said odd number of series connected phase belts included in each circuit of each phase of said winding is one.

15. The dynamoelectric machine set forth in claim 10, wherein said odd number of series connected phase belts included in each circuit of each phase of said winding is three.

16. A dynamoelectric machine comprising a number (N) of pairs of poles and a multi-slot core and a winding including a number (P) of phases carried in the slots of said core and provided with a number (K) of pairs of oppositely poled phase belts, each phase of said winding including a number (M) of parallel connected circuits each including a number (Q) of series connected phase belts, at least one of the circuits in each phase of said winding being arranged in two series connected sections with a junction therebetween, the junctions in the circuits in the phases of said winding occurring at corresponding points therein, and a neutral connection between the junctions in the circuits in the phases of said winding, whereby the induced phase voltage component between any point on any one of the circuits in any one of the phases of said winding and said core is substantially smaller than the induced phase voltage of the one phase of said winding, wherein the number K is equal to the product of the numbers N and P, the number Q is odd, and the number N is equal to one-half the product of the numbers M and Q.

No references cited.